United States Patent [19]

Jorda

[11] 4,327,810
[45] May 4, 1982

[54] TILTING CAB DEVICE FOR VEHICLES

[76] Inventor: Pedro R. Jorda, 83 Antonio Figueras, Tona (Barcelona), Spain

[21] Appl. No.: 82,438

[22] Filed: Oct. 9, 1979

Related U.S. Application Data

[63] Continuation-in-part of Ser. No. 855,503, Nov. 28, 1977, abandoned.

[30] Foreign Application Priority Data

Nov. 27, 1976 [ES] Spain ................................. 453.731

[51] Int. Cl.³ ............................................. B62D 33/06
[52] U.S. Cl. .................................. 180/89.15; 91/394; 91/404
[58] Field of Search ............... 180/89.15; 91/404, 394, 91/396, 451, 452

[56] References Cited

U.S. PATENT DOCUMENTS

| 3,472,547 | 10/1969 | London | 180/89.15 |
| 3,761,123 | 9/1973 | Neill | 180/89.15 |
| 3,801,151 | 4/1974 | Reynolds | 180/89.15 |
| 3,853,368 | 12/1974 | Eichelsheim | 180/89.15 |
| 3,985,194 | 10/1976 | Knutson | 180/89.15 |

FOREIGN PATENT DOCUMENTS 2114824 10/1972 Fed. Rep. of Germany ... 180/89.15

Primary Examiner—John P. Silverstrim
Attorney, Agent, or Firm—William A. Drucker

[57] ABSTRACT

A device for the raising and lowering of a tilting cab of a road vehicle, with respect to the chassis of the vehicle on which the cab is pivoted, permits both lifting and lowering to take place under the control of a manual pump. The cab can also be left in a "floating" condition, when lowered, for the absorption of vibration which would otherwise be transmitted to it by the chassis during running, and in the "floating" condition, exceeding of a certain amplitude of relative movement between the cab and the chassis causes hydraulic clamping of the cab with respect to the chassis. A mechanical locking device may additionally be provided for locking the cab to the chassis in fully lowered condition, and the hydraulic system may permit acceleration of the downward movement of the cab, during lowering, for better engagement of such mechanical locking device.

2 Claims, 11 Drawing Figures

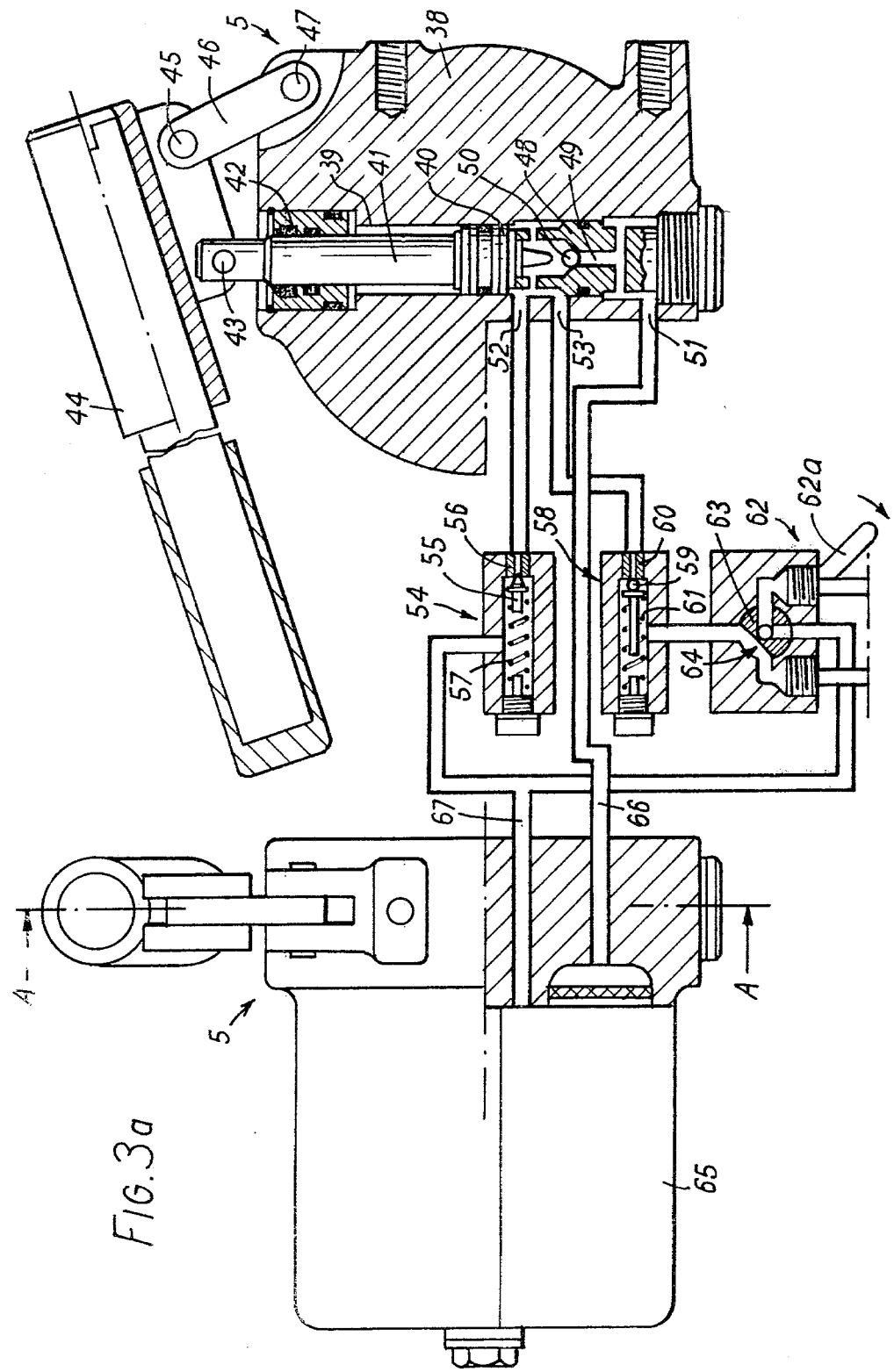

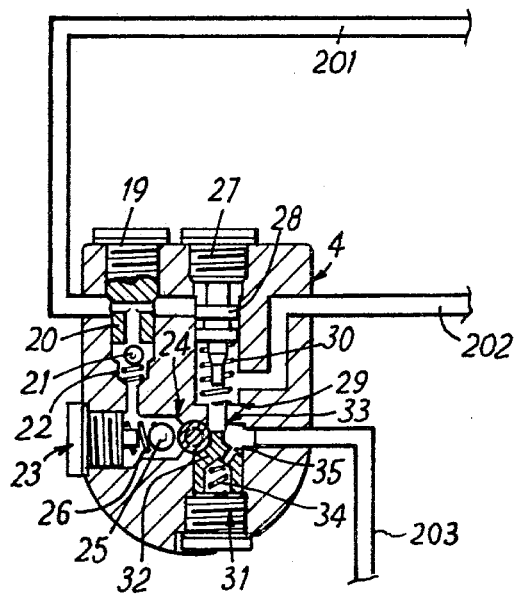

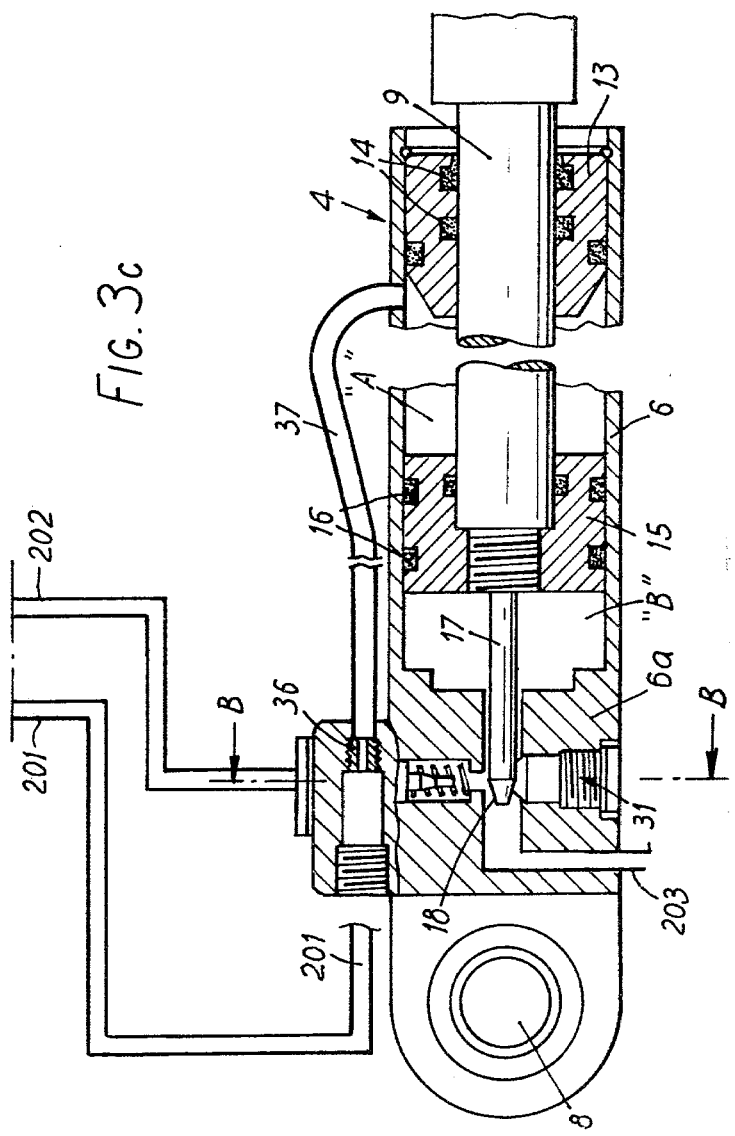

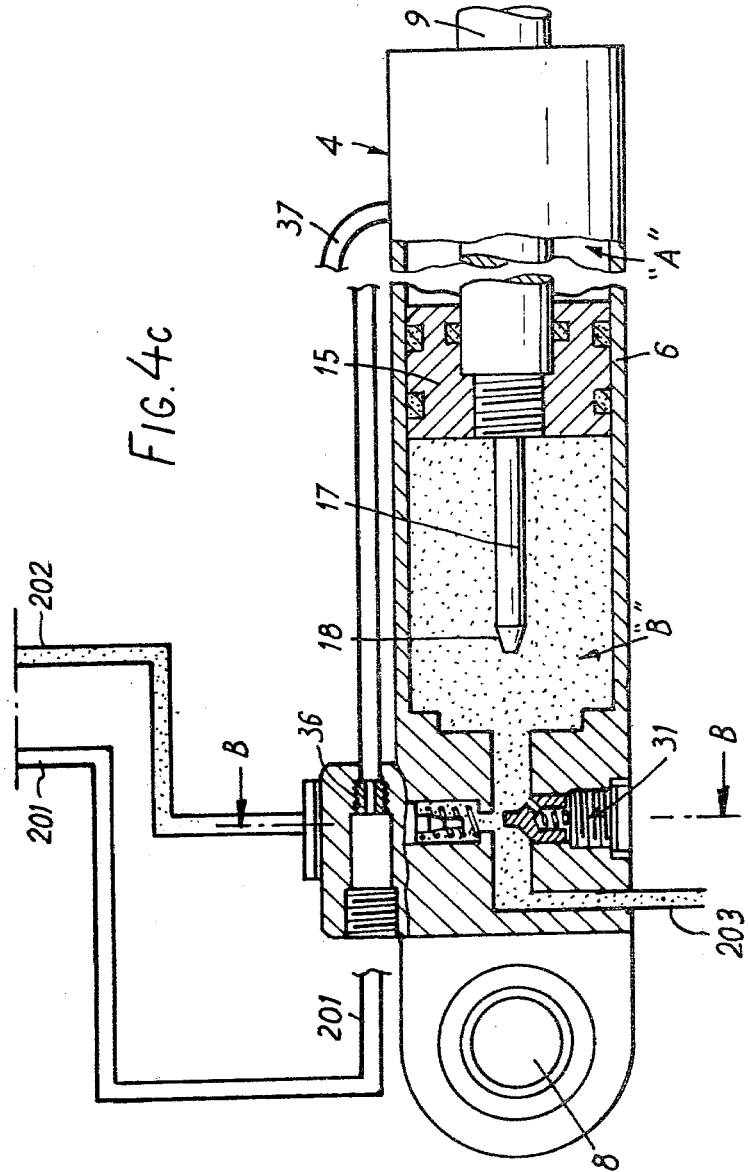

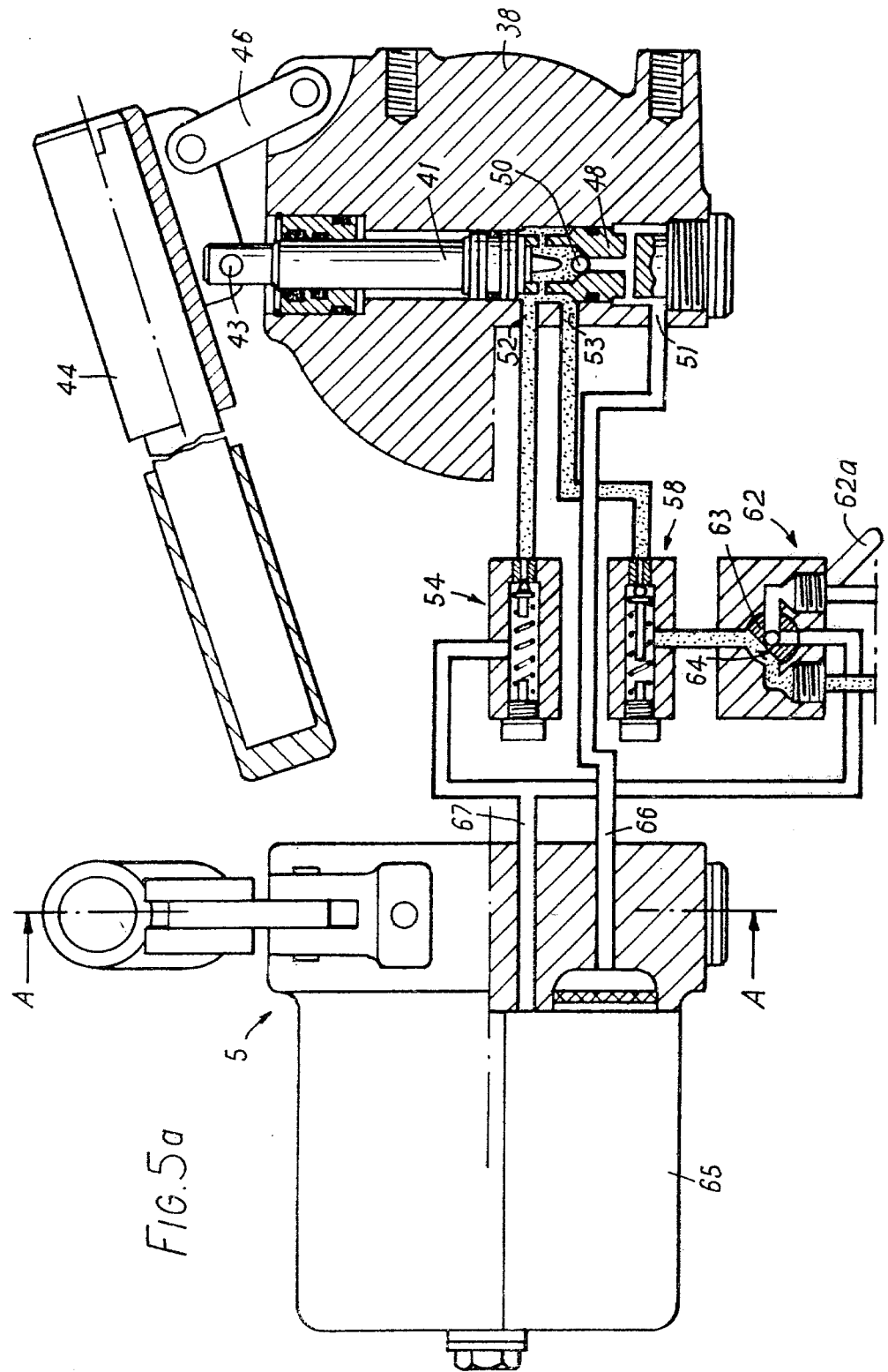

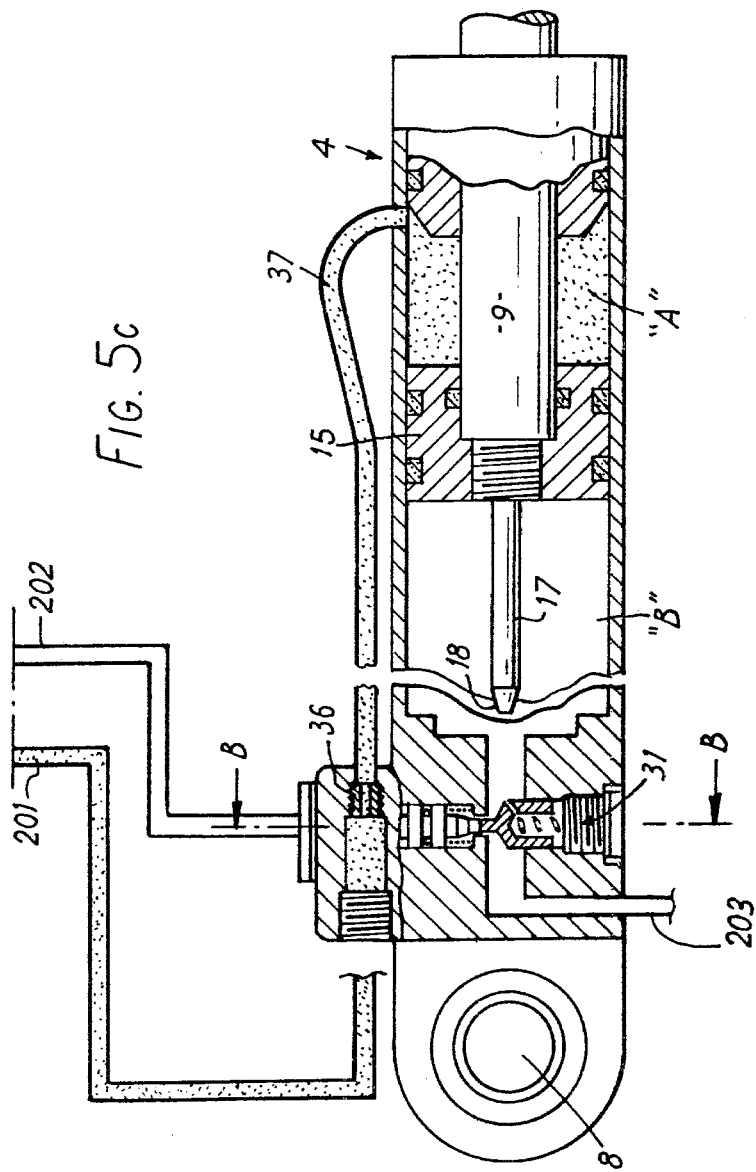

TILTING CAB DEVICE FOR VEHICLES

This is a Continuation-in-part of my co-pending U.S. Pat. application Ser. No. 855,503 filed Nov. 28, 1977, now abandoned.

This invention relates to a device for the hydraulic lifting and lowering of a tilting cab pivoted to a chassis of a road vehicle.

OBJECT OF THE INVENTION

The object of the invention is to provide a device, for the hydraulic lifting and lowering of a tilting cab, wherein provision is made for the cab to have a condition of "floating" when substantially in its fully lowered condition with respect to the chassis, that is to say the cab is free to move, about its pivotal connection to the chassis, with a predetermined small maximum amplitude of permitted movement, thereby to reduce the transmission to the cab of vibration and other greater vertical movements of the chassis occurring during running.

SUMMARY OF THE INVENTION

According to the present invention there is provided a device for the hydraulic lifting and lowering of a cab pivoted to the chassis of a vehicle, comprising:

(i) a hydraulic ram including a cylinder, and a piston slidable in said cylinder and dividing the cylinder space into first and second chambers of variable volume, one of said cylinder and piston being connected to the chassis, the other of said cylinder and piston being connected to the cab;

(ii) a pump for hydraulic liquid;

(iii) a header tank for hydraulic liquid;

(iv) a flow control valve and conduit means connecting said valve to the outlet of said pump, and to said header tank, and to said first and second chambers of the hydraulic ram, said control valve having a first position and a second position, said flow control valve in said first position providing a flow path for hydraulic liquid under pressure from said pump to said first ram chamber, for extension of the ram to raise the cab, and an exhaust flow path from said second ram chamber to the header tank, said control valve in said second position providing a flow path for hydraulic liquid under pressure from said pump to said second ram chamber, for retraction of the ram to lower the cab, and an exhaust flow path from said first ram chamber to the header tank;

(v) restrictor valve means, disposed in said exhaust flow path from said first ram chamber to the header tank, adapted normally to restrict flow of liquid in said exhaust flow path such that lowering of the cab under gravity is braked;

(vi) valve actuating means associated with said ram piston and arranged, when the piston is within a terminal portion of its movement in the direction to retract the ram, to open said restrictor valve means such that the remainder of the piston stroke is unrestricted.

An embodiment of hydraulic lifting and lowering device in accordance with the invention is hereinafter particularly described with reference to the accompanying drawings.

BRIEF DESCRIPTION OF THE DRAWINGS

In the drawings:

FIGS. 3a, 3b, 3c together make-up a schematic of the components and hydraulic circuit of the cab tilting mechanism when the cab is in a lowered "floating" condition as hereinafter explained, FIG. 3b being a section on the line B—B of FIG. 3c;

FIGS. 4a, 4b, 4c together make up a schematic of the components and hydraulic circuit of the cab tilting mechanism when the cab is being raised, FIG. 4b being a section on the line B—B of FIG. 4c, and FIGS. 5a, 5b, 5c together make up a schematic of the components and hydraulic circuit of the cab tilting mechanism when the cab is being lowered, FIG. 5b being a section on the line B—B of FIG. 5c.

DESCRIPTION OF THE PREFERRED EMBODIMENT

Figure 1:
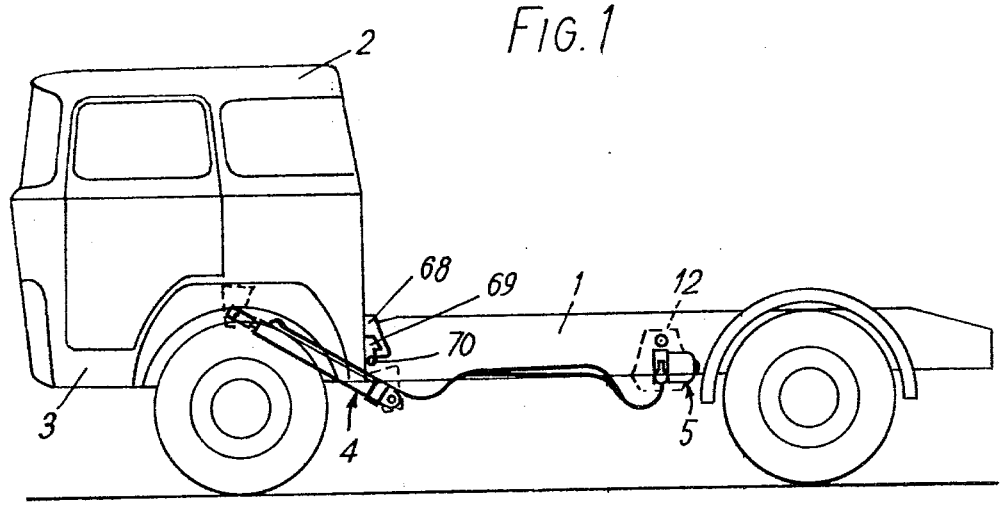
FIG. 1 is a schematic side elevation of a vehicle, equipped with a tilting cab mechanism, with the cab seen in lowered normal operating position.
Figure 2:
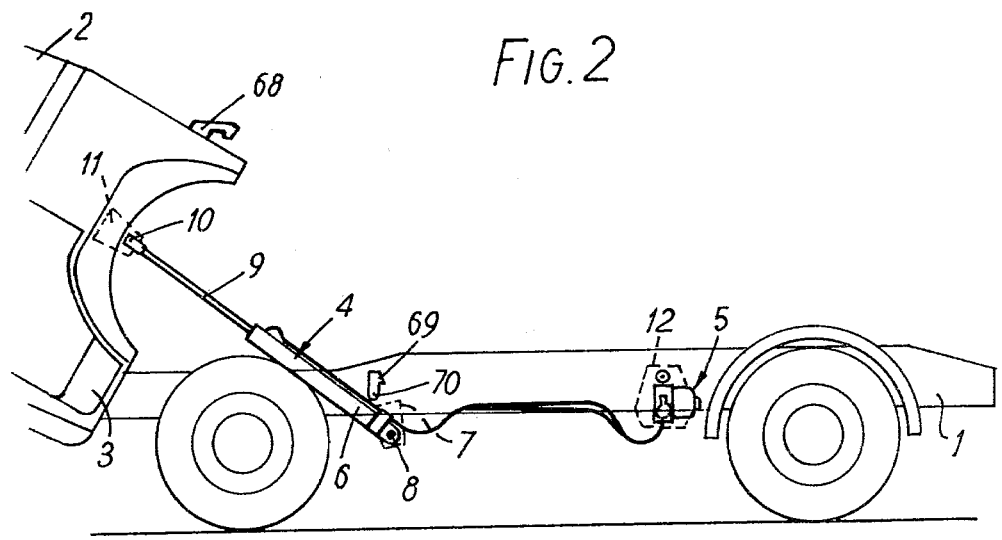
FIG. 2 is a schematic side elevation of the vehicle with the cab seen in tilted raised position.

Referring to FIGS. 1 and 2, there is shown a vehicle having a wheeled chassis 1 on which a cab 2 is mounted by pivot means for tilting about a transverse horizontal axis 3.

Mechanism for tilting the cab 2 with respect to the chassis 1 comprises a hydraulic ram 4, a manually operable hydraulic pump 5, and a hydraulic circuit being explained in detail below with reference to the remaining figures of the drawing.

The ram 4 comprises a cylinder 6 which is mounted on a bracket 7, secured on the chassis 1, by means of a pivot 8. The ram has a piston 9 which is connected by a pivot 10 to a bracket 11 secured on the cab 2.

The hydraulic pump 5 is mounted on a bracket 12 secured on the chassis. Hydraulic piping interconnects the pump and the ram.

Reference is now made to FIGS. 3a, 3b, 3c; 4a, 4b, 4c; 5a, 5b, 5c in which for ease of understanding of the manner of hydraulic operation of the cab tilting mechanism, there have been included both elevational and sectional view of the same components for the purpose of illustrating the interconnection of the hydraulic components in the three possible states of operation of the mechanism, viz. "floating", "raising" and "lowering".

Referring to FIGS. 3a, 3b, 3c which show the hydraulic interconnection of the components in the "floating" state of the cab, the cylinder 6 of the ram 4 has at one end a solid portion 6a which is provided with various bores for oil flow and to receive valve components to be described. At its other end, the cylinder 6 has a gland 13 with sealing rings 14 through which the piston rod 9 can slide in fluid-tight manner. The piston rod 9 carries a piston 15 with sealing rings 16 which seal it slidably to the cylinder wall. Axially on the end of the piston rod 9 there is mounted a valve-actuating rod 17 which is chamfered at its free end as at 18.

Within the solid portion 6a of the cylinder there are provided three spring loaded valves. A first valve 19 has a seating 20 against which a ball 21 is urged by a spring 22.

A second or by-pass valve 23 has a seating 24 against which a ball 25 is urged by a spring 26.

A piston and cylinder device 27 has a piston 28 which is urged away from a seating 29 by a spring 30.

A third valve 31 has a valve element 32 which is urged towards a seating 33 by a spring 34. The device 27 and valve 31 form a restrictor valve. The third valve is positioned in the body 6a of the cylinder such that when the piston is in the fully retracted position shown, the chamfered end 18 of the valve actuating rod engages against the valve element 32 and pushes it downwardly, in this figure, against the pressure of its own spring 34, so that the valve is held open. The ball 25 is likewise held off its seating 24. The valve element 32 includes a passage 35 which equalises pressure at both sides of the element, so that it is not affected by hydraulic pressure applied to it.

An oil flow passage is provided from the valve 19 through a restrictor passage 36 and a pipe 37 to the remote end of the cylinder 6.

Referring now to the manual pump 5, this comprises a body 38 in which there is provided a bore 39 receiving a piston 40 carried on a piston rod 41 which can slide through seal means 42 of the body. The outer end of the piston rod 41 is coupled by a pivot 43 to a handle 44 which is mounted by a pivot 45 on a link 46 itself mounted on the body by a pivot 47. In the bore 39 there is provided a simple non-return inlet valve comprising a seating 48 with an inlet bore 49, and a valve ball 50 which can seat on the seating 48 to close the bore 49. The body has a single oil inlet passage 51, and twin outlet passages 52 and 53.

Outlet passage 52 is connected to a valve 54 having a valve element 55 urged against a bored seating 56 by a spring 57. Valve 54 acts as an excess pressure relief valve, permitting oil to return to a header tank 65. Outlet passage 53 is connected to a valve 58 having a ball 59 urged against a seating by a spring 61, and permitting flow only in the direction from the pump to valve 62.

Rotary valve 62 movable by a hand lever 62a into two positions at 90° to each other, has four passages which can become connected together in various ways, as will be seen from FIGS. 3a; 4a and 5a respectively, according to the position of rotation of the valve rotor 63 having a flat 64.

The valves 54 and 58, and the rotary valve 62 are all incorporated in the body of the pump 5, but are shown separated therefrom for ease of illustration and understanding of the operation. The pump 5 and valves 54 and 62 are connected by piping to a header tank 65 by respective pipes 66 and 67.

In the "floating" condition of the mechanism, the piston rod 9 is fully retracted into the cylinder 6, and the rod 17 is holding the valve elements 32 and 25 in open position. If there is a tendency for the piston rod 9 to move out of the cylinder 6, oil is forced out of the chamber "A" of the cylinder, through the pipe 37 and the restrictor 36, and through the valves 19 and 23 into the chamber "B" of the cylinder. If necessary, further oil can enter the chamber "B" of the ram cylinder from the header tank 65, through the valves 58 and 62.

On the other hand, if the piston rod 9 tends to move farther into the cylinder 6, oil flows out of chamber "B" and through valves 31 and 62 back to the header tank 65. At the same time, oil enters chamber "A" through pipe 37, restrictor 36, rotary valve 62, valve 58 and the pump 5, from the header tank 65.

Acccordingly, so long as the rod 17 holds valves 23 and 31 both open, the piston 15 is free to float endwise in the ram cylinder.

If the piston 15 should happen to move so far, in the direction to move the piston rod 9 out of the cylinder, as to withdraw the operating rod 17 from engagement with the valve elements of the valves 31 and 23, it then becomes impossible for oil to leave the chamber "A" because of the check valve 58 which is closed. Similarly, it becomes impossible for oil to leave the chamber "B" because the ball valve 19 remains closed. Accordingly, under such conditions, the piston 15 is rigidly held against movement in either direction. Thus, the effective "free stroke" of the piston 15, under "cab floating" conditions, is determined by the length of the operating rod 17.

In FIGS. 3a, 3b, 3c none of the oil in the hydraulic circuit is under greater than atmospheric pressure, and accordingly the various flow passages have been left un-shaded in these figures.

The cab may optionally be clamped mechanically in its fully lowered condition, and for this purpose there is provided a hook 68 mounted on the body of the cab and adapted to engage, when the cab is fully lowered, with a detent 69 mounted by a pivot 70 on the chassis of the vehicle. The detent 69 can be moved manually on its pivot to release the hook 68 when required.

Figure 4A:
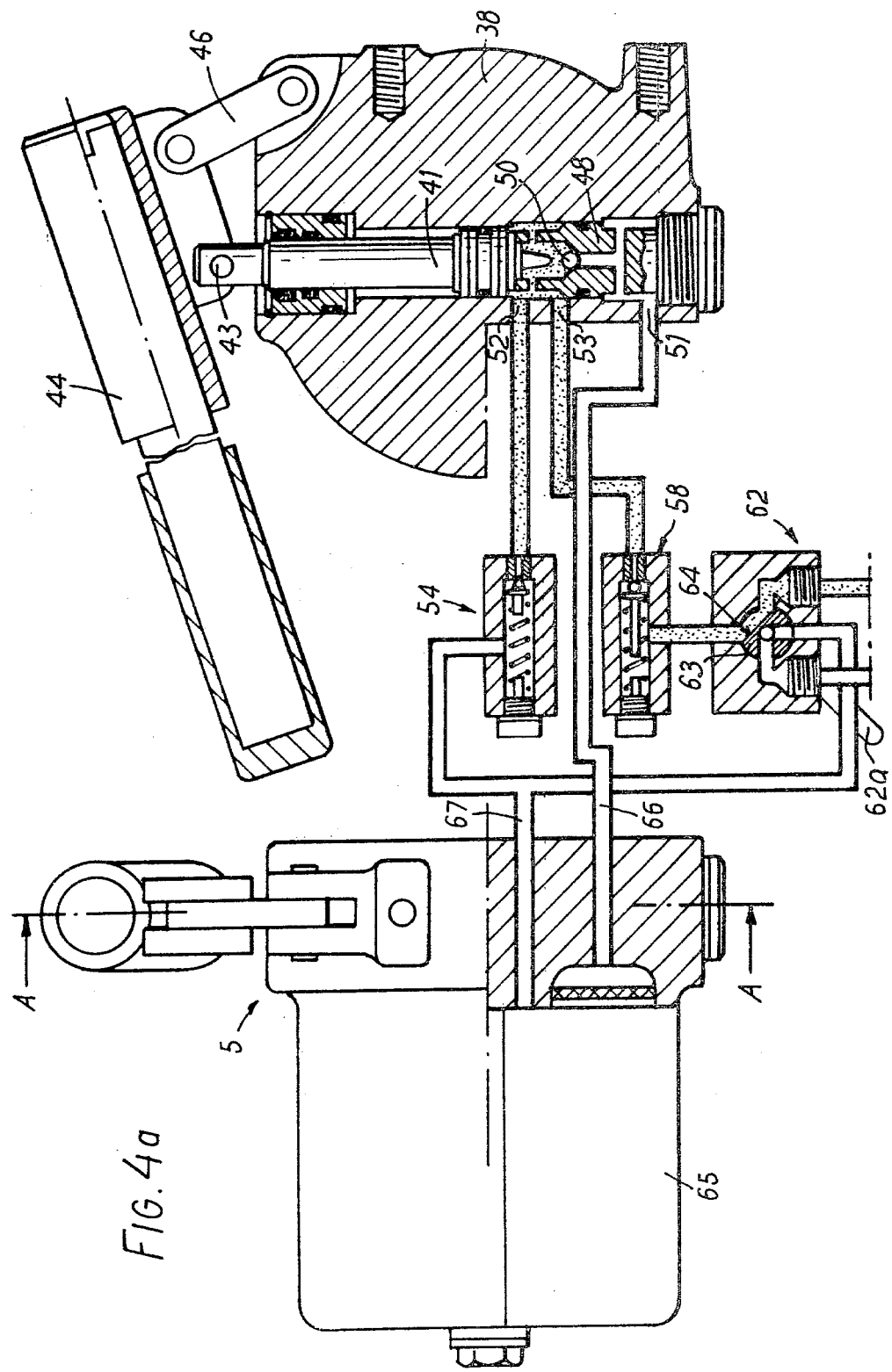
Figure 4B:
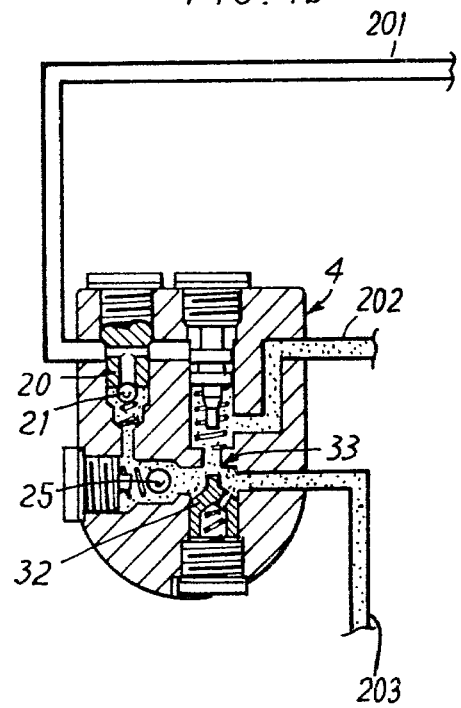

Reference is now made to FIGS. 4a, 4b, 4c which show the state of the components when the pump 5 is being actuated manually for lifting of the cab to tilted raised position.

Raising of the handle 44 causes pump piston 40 to rise and to suck oil into the cylinder 39 from the header tank 65 past ball valve 50, 48. When the handle 44 is then lowered, the valve 50, 48 closes and oil in the cylinder 39 is forced out through valve 58 and then through rotary valve 62 and through valve 31 into chamber "B" of the ram cylinder, thus causing the piston 15 to be moved in the direction to push the piston rod 6 out of the cylinder, and thereby raise the cab. When the operator stops operation of the pump 5, the valve 31 closes under the action of its spring-loading, and oil cannot flow back out of the chamber "B", so the cab remains locked in the raised position.

When the cab is being raised and tilted about its axis 3, a point can be reached when the center of gravity of the cab passes over the tilt axis and the cab then tends to accelerate by gravity into the fully tilted condition. To provide a brake on this overcenter acceleration, the restrictor 36 prevents oil from exhausting from the other chamber "A" at more than a suitably slow rate.

Those parts of the oil circuit which are under greater than atmospheric pressure, during raising of the cab, or whilst it is held raised, have been shown shaded, whereas the remainder of the circuit under exhaust has been left unshaded.

Figure 5B:
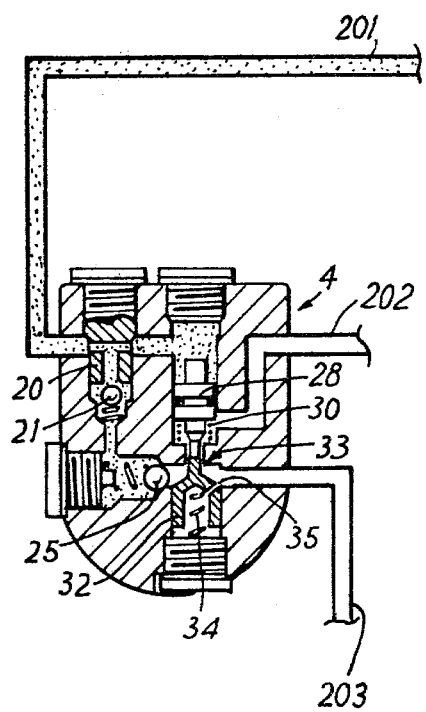

Reference is now made to FIGS. 5a, 5b, 5c which show the state of the components when the cab is being lowered, by operation of the pump 5.

With the rotary valve 62 in the position shown, as the operator works the pump handle 44 up and down, oil is pumped by the pump 5 from the header tank 65 through the valve 58, then through the rotary valve 62, then through the restrictor 36 and the pipe 37 to the chamber "A" of the ram cylinder, thus causing the piston 15 to be moved in the direction to retract the piston rod 9 and cause the cab to be moved towards the lowered position. Those parts under pressure are shown shaded, and those parts under exhaust condition are left unshaded. To prevent too rapid movement of the cab in the downward direction, under gravity, the flow of oil out of the chamber "B" takes place through a flow restrictor constituted by a gap left between the valve element 32 and the seating 33 with which it co-operates. In effect, the valve element 32 is retained in a partially opened condition by being abutted by the piston member 28 urged downwardly, against its spring 30, by the oil under pressure coming to it from rotary valve 62.

When the cab is approaching the end point of its lowering movement, the operating rod 17 comes into engagement with the valve elements 25 and 32 and opens those valves. This removes the restriction on outflow of oil from chamber "B" so that the cab is then free to fall more quickly under gravity. The cab therefore accelerates slightly and the resultant faster movement, over the last small portion of its lowering movement, can help to ensure proper engagement of any optional mechanical locking means which may be provided for locking the cab securely in the fully lowered position.

If there is no such optional mechanical locking device provided, the cab simply attains its "floating" lowering condition described with reference to FIGS. 3, 3a. In each of the three sets of associated drawing FIGS. 3a,3b,3c, and 4a,4b,4c, and 5a,5b,5c, the fluid flow paths are indicated by the same reference numerals 201,202,203.

I claim:

1. A device, for the hydraulic lifting and lowering of a cab pivoted to the chassis of a vehicle, comprising:
   (i) a releasable mechanical locking means on the chassis arranged to lock the cab when the cab is fully lowered,
   (ii) a hydraulic ram including a cylinder, and a piston slidable in said cylinder and dividing the cylinder space into first and second chambers of variable volume, one of said cylinder and piston being connected to the chassis, the other of said cylinder and piston being connected to the cab,
   (iii) a pump for hydraulic liquid
   (iv) a header tank for hydraulic liquid,
   (v) a flow control valve and conduit means connecting said valve to the outlet of said pump, and to said header tank, and to said first and second chambers of the hydraulic ram, said control valve having a first position and a second position, said flow control valve in said first position providing a flow path for hydraulic liquid under pressure from said pump to said first ram chamber, for extension of the ram to raise the cab, and an exhaust flow path from said second ram chamber to the header tank, said control valve in said second position providing a flow path for hydraulic liquid under pressure from said pump to said second ram chamber, for retraction of the ram to lower the cab, and an exhaust flow path from said first ram chamber to the header tank,
   (vi) restrictor valve means, disposed in said exhaust flow path from said first ram chamber to the header tank, adapted normally to restrict flow of liquid in said exhaust flow path such that lowering of the cab under gravity is braked,
   (vii) valve actuating means associated with said ram piston and arranged, when the piston is within a terminal portion of its movement in the direction to retract the ram, to open said restrictor valve means such that the remainder of the piston stroke is unrestricted and lowering of the cab under gravity is accelerated to facilitate locking of the cab in lowered condition by said locking means.

2. A device, as claimed in claim 1, comprising a non-return valve, in said conduit means between said pump and said flow control valve, arranged to permit flow only in the direction from said pump to said flow control valve.

* * * * *